(12) United States Patent
Niemeyer et al.

(10) Patent No.: US 10,441,885 B2
(45) Date of Patent: Oct. 15, 2019

(54) AUDIO BALANCING FOR MULTI-SOURCE AUDIOVISUAL STREAMING

(71) Applicant: Microsoft Technology Licensing, LLC, Redmond, WA (US)

(72) Inventors: Daniel Diniz Niemeyer, Seattle, WA (US); Gerald Albert Pogue, Jr., Redmond, WA (US); Stefan Francis Slivinski, Mercer Island, WA (US); Nicholas Jie Fang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/620,537

(22) Filed: Jun. 12, 2017

(65) Prior Publication Data

US 2018/0353855 A1 Dec. 13, 2018

(51) Int. Cl.
*A63F 9/00* (2006.01)
*A63F 13/424* (2014.01)
(Continued)

(52) U.S. Cl.
CPC .......... *A63F 13/424* (2014.09); *A63F 13/335* (2014.09); *G06F 3/0362* (2013.01);
(Continued)

(58) Field of Classification Search
None
See application file for complete search history.

(56) References Cited

U.S. PATENT DOCUMENTS

| 5,608,651 A | 3/1997 | Leavy et al. |
| 6,183,367 B1 * | 2/2001 | Kaji .................. A63F 13/12 345/418 |

(Continued)

FOREIGN PATENT DOCUMENTS

WO 2011154818 A2 12/2011

OTHER PUBLICATIONS

"International Search Report & Written Opinion issued in PCT Application No. PCT/US/2018/034021", dated Nov. 9, 2018, 12 Pages.

*Primary Examiner* — Seng Heng Lim
(74) *Attorney, Agent, or Firm* — Alleman Hall Creasman & Tuttle LLP

(57) ABSTRACT

A mobile computing device provides real-time streaming of multiple sources of audio and video. The mobile computing device receives audio and video streams from multiple sources, including a camera video stream, a microphone audio stream, a game audio stream, and a game video stream. The device adjusts microphone and/or the game input levels based on a user-selected audio mix setting to produce rebalanced microphone and game audio streams, multiplexes the rebalanced microphone and game audio streams to produce a multiplexed audio stream, and encodes the multiplexed audio stream to produce an encoded audio stream. The user-selected audio mix setting may be adjusted by a user of the mobile computing device. The mobile computing device packages the encoded audio stream with an encoded video stream of composited camera and game video streams into one or more streaming packets, and outputs the one or more streaming packets.

18 Claims, 5 Drawing Sheets

(51) Int. Cl.
 *G06F 3/0484* (2013.01)
 *G06F 3/0362* (2013.01)
 *G06F 3/0482* (2013.01)
 *A63F 13/335* (2014.01)
 *H04H 60/04* (2008.01)
 *H04N 21/414* (2011.01)
 *H04N 21/422* (2011.01)
 *H04N 21/4223* (2011.01)
 *H04N 21/478* (2011.01)
 *H04N 21/4788* (2011.01)

(52) U.S. Cl.
 CPC ........ *G06F 3/0482* (2013.01); *G06F 3/04847* (2013.01); *H04H 60/04* (2013.01); *H04N 21/41407* (2013.01); *H04N 21/4223* (2013.01); *H04N 21/42203* (2013.01); *H04N 21/4781* (2013.01); *H04N 21/4788* (2013.01); *A63F 2300/308* (2013.01); *A63F 2300/6072* (2013.01)

(56) References Cited

U.S. PATENT DOCUMENTS

| | | | |
|---|---|---|---|
| 8,107,614 B2 | 1/2012 | Sobti et al. | |
| 8,128,503 B1* | 3/2012 | Haot | H04N 21/234 |
| | | | 375/E7.006 |
| 8,200,479 B2 | 6/2012 | Sintes et al. | |
| 9,203,883 B2 | 12/2015 | Momchilov et al. | |
| 9,473,758 B1 | 10/2016 | Long et al. | |
| 9,687,746 B2* | 6/2017 | Sullivan | A63F 13/86 |
| 9,795,871 B2* | 10/2017 | Trombetta | A63F 13/00 |
| 2001/0033666 A1 | 10/2001 | Benz | |
| 2003/0220145 A1* | 11/2003 | Erickson | A63F 13/02 |
| | | | 463/47 |
| 2006/0058103 A1* | 3/2006 | Danieli | A63F 13/12 |
| | | | 463/42 |
| 2006/0168114 A1 | 7/2006 | Glatron et al. | |
| 2006/0209941 A1* | 9/2006 | Kroeger | H03L 7/093 |
| | | | 375/222 |
| 2006/0232586 A1* | 10/2006 | Terada | G06T 11/206 |
| | | | 345/440 |
| 2007/0117635 A1* | 5/2007 | Spanton | A63F 13/12 |
| | | | 463/43 |
| 2010/0023637 A1 | 1/2010 | Kamath et al. | |
| 2011/0314093 A1* | 12/2011 | Sheu | G06F 9/4445 |
| | | | 709/203 |
| 2013/0123019 A1* | 5/2013 | Sullivan | A63F 13/86 |
| | | | 463/42 |
| 2013/0336412 A1* | 12/2013 | Erofeev | G11B 27/031 |
| | | | 375/240.28 |
| 2014/0018165 A1* | 1/2014 | Kern | A63F 13/355 |
| | | | 463/31 |
| 2014/0187317 A1* | 7/2014 | Kohler | H04N 21/4402 |
| | | | 463/31 |
| 2014/0211960 A1 | 7/2014 | Dowdy et al. | |
| 2014/0297799 A1* | 10/2014 | Gordon | H04L 67/38 |
| | | | 709/217 |
| 2015/0290540 A1* | 10/2015 | Trombetta | A63F 13/00 |
| | | | 463/31 |
| 2015/0298010 A1* | 10/2015 | Trombetta | A63F 13/87 |
| | | | 463/42 |
| 2017/0109122 A1* | 4/2017 | Schmidt | G06F 3/1454 |
| 2017/0182426 A1* | 6/2017 | Loeb | A63F 13/87 |
| 2017/0237795 A1* | 8/2017 | Wogsberg | H04L 65/607 |
| | | | 709/219 |
| 2017/0312624 A1* | 11/2017 | Perlman | A63F 13/352 |
| 2018/0093174 A1* | 4/2018 | Trombetta | A63F 13/00 |

\* cited by examiner

AUDIO BALANCING FOR MULTI-SOURCE AUDIOVISUAL STREAMING

BACKGROUND

Information networks such as the Internet may be used within the context of electronic games to support collaborative gameplay among remotely located players, and the ability for spectators to remotely view the gameplay of others. Some network media services enable players of electronic games to stream a visual representation of their view of the game along with an audiovisual representation of the player, thereby enabling players to provide commentary to spectators during gameplay.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A mobile computing device provides real-time streaming of multiple sources of audio and video. The mobile computing device includes a camera to generate a camera video stream, and a microphone to generate a microphone audio stream. The mobile computing device receives audio and video streams from multiple sources, including the camera video stream generated by the camera, the microphone audio stream generated by the microphone, a game audio stream generated by a game program, and a game video stream generated by the game program.

The mobile computing device adjusts one or both of a microphone input level and a game input level based on a user-selected audio mix setting to produce rebalanced microphone and game audio streams. The user-selected audio mix setting may be adjusted by a user of the mobile computing device. The mobile computing device multiplexes the rebalanced microphone and game audio streams to produce a multiplexed audio stream, and encodes the multiplexed audio stream to produce an encoded audio stream.

The mobile computing device composites the camera video stream and the game video stream to produce a composited video stream, and encodes the composited video stream to produce an encoded video stream. The mobile computing device performs a time stamp correction operation to temporally synchronize the encoded audio stream and the encoded video stream to produced synchronized encoded audio and video streams. The mobile computing device packages the synchronized encoded audio and video streams into one or more streaming packets, and outputs the one or more streaming packets.

DETAILED DESCRIPTION

Figure 1:
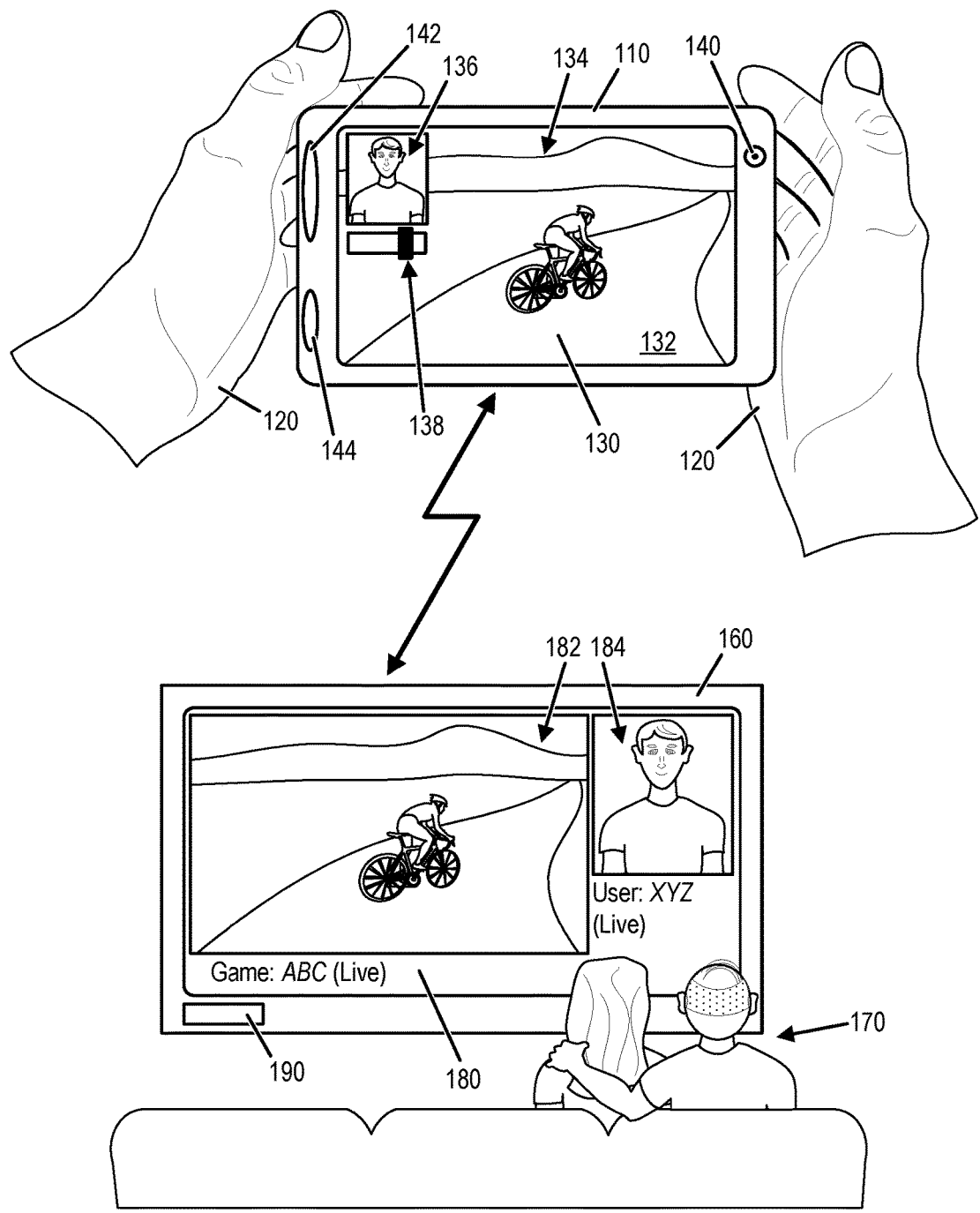
FIG. 1 depicts an example use-scenario in which a mobile computing device streams video game audio and video with game player audio and video to a remote device.

FIG. 1 depicts an example use-scenario in which a mobile computing device 110 streams video game audio and video with game player audio and video to a remote device. In this example, mobile computing device 110, operated by a user 120, includes a graphical display device 130 that is presenting a graphical user interface (GUI) 132. GUI 132 may include one or more interfaces that form components of the GUI.

For example, GUI 132 may include a game interface 134 for a game program (i.e., a video game) being played by user 120 at mobile computing device 110. Game interface 134 may correspond to a game view presented during gameplay to user 120 as a game player of the game program. A visual representation of game interface 134 is streamed from mobile computing device to remote device 160 for presentation via a graphical display device 180 to one or more remote viewers 170 as graphical content 182. Graphical content 182 may take the form of a video of game interface 134.

Mobile computing device 110 may stream other visual content to remote device 160. For example, a visual representation of a camera view captured by a camera 140 of mobile computing device 110 may be streamed to remote device 160 for presentation via graphical display device 180 to remote viewers 170 as graphical content 184. Graphical content 184 may take the form of a video of the camera view captured by camera 140. In this example, the camera view includes user 120, thereby enabling remote viewers 170 to see a visual representation of user 120 alongside a visual representation of the game interface. This visual representation of user 120 may be referred to as game player video within the context of user 120 being a game player of a game program.

Another interface component of GUI 132 at mobile computing device 110 may include a camera view interface 136, which in this example includes the camera view captured by camera 140. Camera view interface 136 enables user 120 to see the camera view captured by camera 140, thereby assisting user 120 to align the camera view with a desired subject. Camera view interface 136 may be omitted from GUI 132 in at least some implementations.

Mobile computing device 110 may further include an audio speaker 142 and an audio microphone 144. Audio of the game program being played by user 120 may be output locally by audio speaker 142. Audio generated by user 120 and/or the user's surroundings, such as the user's spoken commentary, may be captured by microphone 144.

Audio representations of game audio of the game program and microphone audio captured by microphone 144 may be streamed by mobile computing device 110 to remote device 160 for presentation to remote viewers 170. Remote device 160 may output the audio of the game program and/or the audio captured remotely by microphone 144 via an audio speaker 190. Hence, remote viewers 170 may listen to game audio and microphone audio that was streamed from mobile computing device. Microphone audio capturing spoken commentary of user 120 may be referred to as game player audio within the context of user 120 being a game player of a game program.

Another component of GUI 132 may include a graphical control element 138 that includes an audio mix control element that enables user 120 to rebalance audio levels streamed to remote device 160. For example, user 120 may control the mix of game audio and microphone audio that is streamed to and output by remote device 160 through manipulation of the graphical control element 138 locally displayed at the user's device. However, other user input modalities beyond graphical control elements may be used to enable a user to adjust the audio mix or other aspects of the streamed audio and/or video (e.g., hardware controls, speech recognition, and/or gesture recognition).

Figure 2:
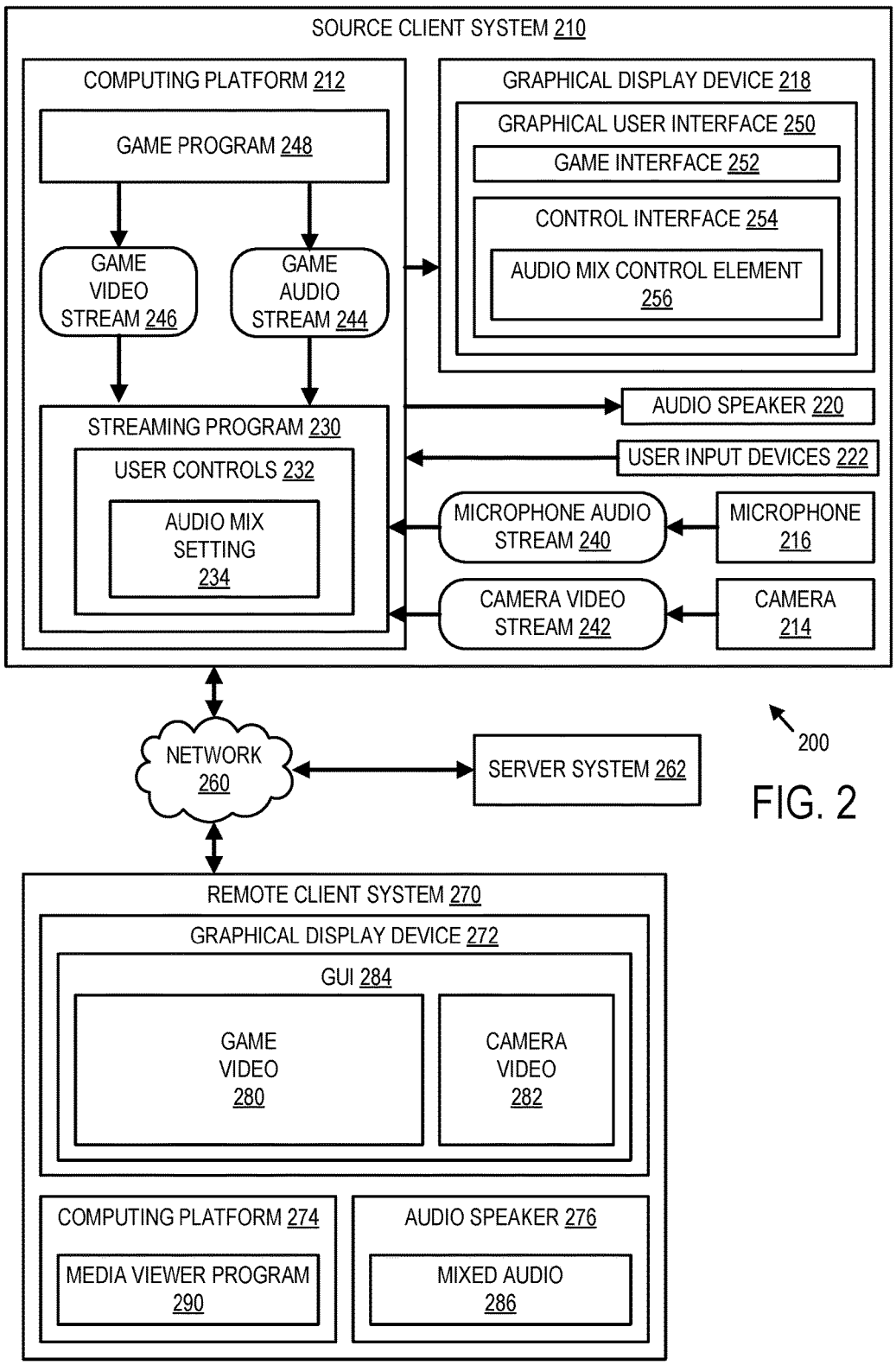
FIG. 2 is a schematic diagram depicting an example computing system.

FIG. 2 is a schematic diagram depicting an example computing system 200. A source client system 210 of computing system 200 includes a computing platform 212, a camera 214, a microphone 216, graphical display device 218, audio speaker 220, and one or more user input devices 222. Mobile computing device 110 of FIG. 1 is a non-limiting example of source client system 210. However, source client system 210 may take other suitable forms, including computing devices that also incorporate components 212, 214, 216, 218, 220, 222, etc. into a single integrated enclosure, and computing systems that incorporate these components into multiple devices having separate enclosures.

Computing platform 212 may execute or otherwise implement a game streaming program 230 that receives audio and/or video from multiple sources, processes the audio and/or video through a streaming pipeline, and outputs streaming packets for delivery to a recipient. For example, game streaming program 230 may receive a microphone audio stream 240 that is generated by microphone 216, a camera video stream 242 that is generated by camera 214, a game audio stream 244 of a game program 248, and a game video stream 246 of the game program 248. Game program 248 may be executed at computing platform 212 in at least some implementations. However, game program 248 may be at least partially remotely executed at a remote computing platform, such as server system 262 in other implementations.

Game streaming program 230 may be distributed across two or more computing devices that collectively form computing platform 212. As an example, computing platform 212 may include one or more general-purpose processors and/or one or more special purpose logic machines (e.g., a video encoder). In this example, game streaming program 230 may include software executable by the one or more general-purpose processors, and may include firmware or hardware instructions executable by the one or more special purpose logic machines.

Game streaming program 230 may include one or more user controls 232, such as a user-selected audio mix setting 234 that enables a user to rebalance audio from two or more sources for streaming to a remote device. User-selected audio mix setting 234 may be accessed by a user in a variety of ways. In an example, a graphical element in the form of an audio mix control element 256 may be presented via graphical display device 218 as part of a control interface 254 of a GUI 250. Control interface 138 of FIG. 1 is a non-limiting example of control interface 254. The user may interact with audio mix control element 256 to adjust an audio mix between game audio stream 244 and microphone audio stream 240 streamed to a remote device.

Graphical display device 218 may further present a game interface 252 of game program 248 as a component of GUI 250. Game interface 134 of FIG. 1 is a non-limiting example of game interface 252. Game interface 252 may correspond to a game view presented during gameplay to the user of source client system 210 as a player of game program 248.

As will be described in further detail with reference to FIGS. 3 and 4, game streaming program 230 may define a streaming pipeline that combines audio and video from multiple sources, encodes the audio and video, and streams the audio and video to remote recipients. Within the context of computing system 200, the audio and video may be streamed to a remote client system 270 over a communications network 260. In at least some implementations, server system 262 may receive audio and video streams from source client system 210, and may facilitate the broadcast of the audio and video streams to a population of many remote client systems. In other implementations, source client system 210 may stream audio and video directly to receiving client system 270 without the use of an intermediate server system.

Remote client system 270 may include a graphical display device 272, a computing platform 274, and an audio speaker 276. Computing platform 274 may execute a media viewer program 290 that receives streaming audio and/or video from a source such as source client system 210 or server system 262, and facilitates the presentation of the streaming audio and/or video. For example, game video 280 and camera video 282 may be presented via graphical display 272, and mixed audio 286 may be output by audio speaker 276.

In this example, mixed audio 286 corresponds to audio streamed by source client system 210, which includes microphone audio stream 240 and game audio stream 244 having audio levels rebalanced based on the user-selected audio mix setting 234. Also in this example, game video 280 corresponds to a visual representation of game video stream 246, and camera video 282 corresponds to a visual representation of camera video stream 242. Game video 280 and camera video 282 may be composited prior to streaming in at least some implementations. While game video and camera video are shown in FIG. 2 in a side-by-side configuration within a common GUI 284, it will be understood that other suitable configurations may be supported. For example, camera video 282 may be overlaid upon game video 280 or vice-versa. As another example, a user may selectively toggle between a view of game video 280 and a view of camera video 282. As such, game video 280 and camera video 282 may not be concurrently presented in at least some implementations.

Figure 3:
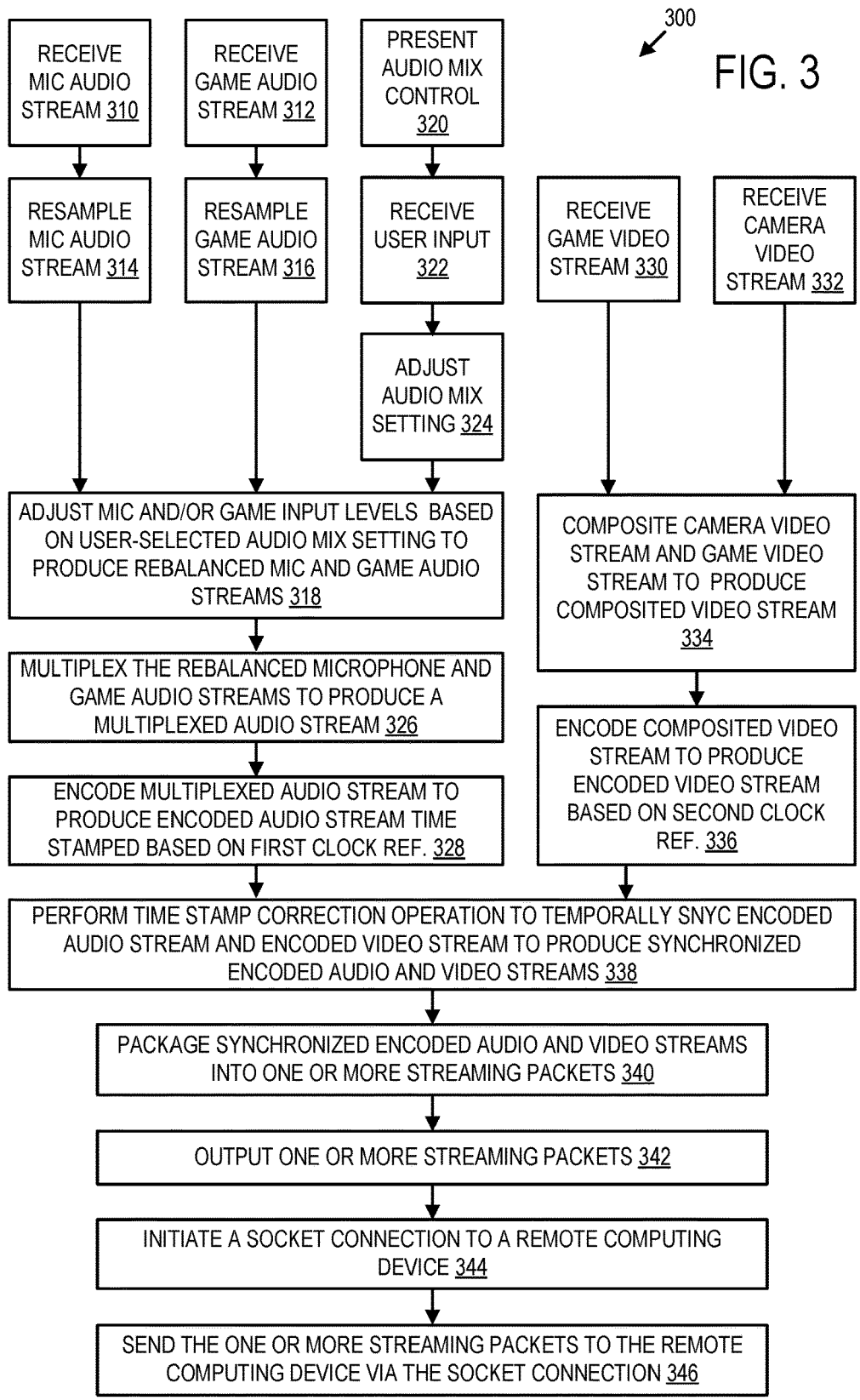
FIG. 3 is a flow diagram depicting an example method for streaming multiple sources of audio and video.

FIG. 3 is a flow diagram depicting an example method 300 for streaming multiple sources of audio and video. Method 300 or portions thereof may be performed by a computing platform executing a game streaming program, such as previously described game streaming program 230 of FIG. 2. Method 300 or portions thereof may be referred to as a streaming pipeline that is defined by the game streaming program. Upon execution of the game streaming program, the streaming pipeline may initiate any number of process threads that are used to perform the various operations or processes of method 300. A non-limiting example of process threads associated with an audio component of the streaming pipeline is described in further detail with reference to FIG. 4.

At 310, the method includes receiving a microphone audio stream generated by a microphone. The microphone audio stream may be received at a microphone input level and at a microphone input sample rate. The microphone audio stream may correspond to the previously described microphone audio stream 240 of FIG. 2, for example.

At 312, the method includes receiving a game audio stream generated by a game program. The game audio stream may be received at a game input level and at a game input sample rate. In at least some implementations, the microphone audio stream and the game audio stream are received in parallel. The game audio stream may correspond to the previously described game audio stream 244 of FIG. 2, for example. In at least some implementations, the game program may be executed by the same computing platform or computing system that executes the game streaming program. For example, within the context of a mobile computing device serving as a source of streaming audio and/or video, the mobile computing device may execute the game program to locally generate the game audio stream. However, in other implementations, the game audio stream may be received from a remote source.

At 314 and 316, the method includes resampling one or more of the microphone audio stream received at 310 and/or the game audio stream received at 312 to produce corresponding microphone and game audio streams of a common sample rate. The common sample rate may correspond to a predefined target sample rate, a user selected sample rate, the lowest sample rate among the microphone and game input sample rates, or the highest sample rate among the microphone and game input sample rates, depending on implementation or available computing resources. In at least some implementations, the common sample rate may be programmatically selected by the streaming program based on operating conditions such as available bandwidth of a network connection over which the audio is to be streamed, available memory of the computing platform, available buffer space, changing sample rate of input audio streams (e.g., changing a microphone or game that provides a source of input audio), or other suitable conditions. Accordingly, the common sample rate may be changed dynamically over time by the streaming program responsive to operating conditions, for example, to provide a real-time streaming experience at best effort sample rates.

As a first example, the microphone audio stream may be resampled from the microphone input sample rate to a different sample rate that matches the game input sample rate of the game audio stream. As a second example, the game audio stream may be resampled from the game input sample rate to a different sample rate that matches the microphone input sample rate of the microphone audio stream. As a third example, both the microphone audio stream and the game audio stream may be resampled from their respective input sample rates to the same target sample rate. Resampling at 314 and 316 may be omitted in at least some implementations.

At 318, the method includes adjusting one or more of the microphone input level and/or the game input level based on a user-selected audio mix setting to produce rebalanced microphone and game audio streams.

In at least some implementations, the user-selected audio mix setting may be represented by a value within range of values. For example, a first end of the range of values may correspond to a greater contribution (e.g., higher gain/higher volume) of the microphone audio stream relative to the game audio stream within the rebalanced microphone and game audio streams. A second end of the range of values may correspond to a greater contribution (e.g., higher gain/ higher volume) of the game audio stream relative to the microphone audio stream within the rebalanced microphone and game audio streams.

In the above example, the first end of the range of values may correspond to only the microphone audio stream being represented and the game audio stream being omitted or having a volume of zero. Furthermore, the second end of the range of values, opposite the first end, may correspond to only the game audio stream being represented and the microphone audio being omitted or having a volume of zero. Within the range of values between the first and second ends, the relative gain of microphone and game audio streams may be scaled in opposing directions in a variety of different ways, including linearly, by audio taper, or by other suitable function. In another example, a linear mean of both inputs may be stored in a look-ahead buffer to be used during the multiplexing process to output a rebalanced multiplexed stream that smooths out stretched/attenuated frequencies, since the linear combination on its own may result in frequencies beyond the cut-out point for at least some audio speakers.

In at least some implementations, the method at 320 may include presenting, via a graphical display device, a GUI that includes an audio mix control element. The user input received at 322 may be directed at the audio mix control element of the GUI. At 324, the value of the audio mix setting may be adjusted or otherwise identified within the range of values responsive to the user input received at 322. In at least some implementations, the value of the user-selected audio mix setting may be initially set to a default value, prior to the user input being received at 322. This default value may correspond to a pre-defined adjustment (e.g., no adjustment) of the microphone input level and/or the game input level.

The audio mix control element may take the form of previously described audio mix control element 256 of FIG. 2. As one example, the audio mix control element may include one or more graphical buttons that, upon selection by the user input, varies the value of the user-selected audio mix setting within the range of values. In at least some implementations, a spatial position of the audio mix control element within a range of positions corresponds to the value of the user-selected audio mix setting within the range of values. For example, the audio mix control element may include a graphical slider that is translatable within the range of positions along an axis or path, or a graphical knob that is rotatable within the range of positions about a rotation axis. Alternatively or additionally, the user-selected audio mix setting may be accessed by a user providing a user input via another input modality, such as a physical button, voice command, tilting an input device, etc.

At 326, the method includes multiplexing the rebalanced microphone and game audio streams to produce a multiplexed audio stream. In at least some implementations, the rebalanced microphone and game audio streams are multiplexed in real-time by a multiplexer process to produce the multiplexed audio stream. The real-time streaming may be supported during multiplexing by limiting buffering within the multiplexer process to an individual frame or packet of an individual audio stream while arrival is delayed of a corresponding frame or packet of another audio stream that is to be multiplexed. However, real-time streaming with human-imperceptible delay may be achieved by buffering a limited set of two or more frames or packets of each audio stream within the multiplexer process.

The microphone and game audio streams having the same sample rate (e.g., following resampling) may be combined sample by sample by aligning the amplitude of each sample of the microphone audio stream with the amplitude of each sample of the game audio stream based on a time stamp or other suitable indicator to obtain a multiplexed sample for each temporally aligned pair of samples. In at least some implementations, the adjustment to the input levels of the microphone and game audio at 318 may be performed within the multiplexing process at 326 by resealing samples based on the user-selected audio mix setting to obtain rescaled samples that are then combined to obtain the multiplexed sample for each sample pair.

At 328, the method includes encoding, via an audio encoder, the multiplexed audio stream to produce an encoded audio stream. In at least some implementations, the encoded audio stream may be time stamped based on a first clock reference of the audio encoder. This time stamp of the encoded audio stream may be used to synchronize the encoded audio stream with an encoded video stream.

At 330, the method includes receiving a camera video stream generated by a camera. At 332, the method includes receiving a game video stream generated by the game program executed at the mobile computing device. As previously described, the game program may be executed by the same computing platform or computing system that executes the game streaming program. For example, within the context of a mobile computing device serving as a source of streaming audio and/or video, the mobile computing device may execute the game program to locally generate the game video stream. However, in other implementations, the game video stream may be received from a remote source. In at least some implementations, the camera video stream and the game video stream are received in parallel.

At 334, the method includes compositing the camera video stream and the game video stream to produce a composited video stream. In at least some implementations, the camera video stream and the game video stream may be composited in real-time to produce the composited video stream. A video compositor of the streaming pipeline may composite the camera and game video streams to produce the composited video stream. Furthermore, in at least some implementations, operations associated with compositing at 334 may be omitted. For example, only a single video stream, such as e.g., a camera, a game, or another application video stream may be received as a video input. As another example, two video streams may be received, but a user may select an option to omit one of the two video streams from a broadcast stream. Accordingly, compositing of video streams may not be performed under some conditions.

At 336, the method includes encoding, via a video encoder, the composited video stream to produce an encoded video stream. In at least some implementations, the encoded video stream may be time stamped based on a second clock reference of the video encoder. This time stamp of the encoded video stream may be used to synchronize the encoded video stream with the encoded audio stream. In at least some implementations, the multiplexed audio stream and the composited video stream are encoded in parallel.

At 338, the method includes performing a time stamp correction operation to temporally synchronize the encoded audio stream and the encoded video stream to produced synchronized encoded audio and video streams. For example, synchronization may be performed by aligning the time stamp of the encoded audio stream that is based on a first clock reference of the audio encoder with the time stamp of the encoded video stream that is based on a second clock reference of the video encoder.

At 340, the method includes packaging the synchronized encoded audio and video streams into one or more streaming packets. At 342, the method includes outputting the one or more streaming packets. The streaming packets output at 342 may be output to local storage and/or transmitted to a remote computing device. In a real-time implementation, the streaming packets may be transmitted to a remote computing device without an intermediate storage operation or with limited buffering of the output stream. Within real-time implementations, the user of the source client system is able to rebalance the game and microphone audio streams output at a remote device in real-time.

For example, at 344, the method includes initiating a socket connection to a remote computing device. The socket connection may be initiated over a communications network, such as example network 260 of FIG. 2. In an example, the remote computing device may include a client computing device or client system, such as example remote client system 270 of FIG. 2. In another example, the remote computing device may include a server computing device or server system, such as example server system 262 of FIG. 2.

At 346, the method includes sending the one or more streaming packets to the remote computing device via the socket connection. The remote computing device may receive and process the one or more streaming packets in a variety of ways depending on implementation. In an example where the remote computing device includes a client operated by a user, the streaming packets may be processed to present the audio and visual content to the user. In another example where the remote computing device includes a server, the streaming packets may be processed, for example, to broadcast the streaming packets to a population of many clients.

Within real-time streaming implementations, buffering of streaming packets are reduced, minimized, or eliminated to the greatest extent possible. The local synchronization of encoded audio and video streams at 338 to produce synchronized encoded audio and video streams may benefit real-time streaming implementations by reducing, minimizing, or eliminating buffering of the audio/video stream at the source client system and/or at an intermediate server system that facilitates the broadcasting of the audio/video stream to remote client systems. Furthermore, the resampling of audio streams to the common sample rate at 314 and 316 may enable more efficient multiplexing at 326, thereby reducing or minimizing the quantity of frames or packets buffered at the multiplexer process for purposes of synchronization of multiplexed frames or packets.

While the various approaches of the present disclosure are described within the context of microphone and game audio streams, it will be understood that any two audio streams may be rebalanced and combined using these same or similar approaches. For example, a game audio stream may instead refer to an audio stream generated by an application program that is not necessarily a game program. As another example, audio streams from two different application programs may be rebalanced and combined using the approaches described herein.

Furthermore, the various approaches of the present disclosure may be used to combine three or more audio streams (n audio streams) from three or more audio sources (n audio sources) to obtain a multiplexed audio stream that may be streamed to remote devices over a network. For example, multiple microphone audio streams received from multiple microphones may be combined with one or more audio streams received from one or more game programs or other application programs to obtain a multiplexed audio stream. Within this context, the previously described resampling and alignment techniques for multiplexing two audio sources may be similarly applied to combining three or more audio sources. For example, three or more audio streams may be resampled to a common sample rate, and then combined on a sample by sample basis by aligning the amplitude of respective samples from each stream based on a time stamp associated with each stream. In at least some implementations, a streaming program may support up to 255 multiplexed audio streams, which corresponds to theoretical audio interpolation maximum of 255 channels.

Further still, the various approaches of the present disclosure may be performed in parallel to stream stereo right and left channels of multiplexed audio streams, each formed by a combination of two or more source audio streams. For example, a left channel microphone audio stream may be resampled and multiplexed with a resampled left channel game audio stream to obtain a left channel multiplexed audio stream, and a right channel microphone audio stream may be resampled and multiplexed with a resampled right channel game audio stream to obtain a right channel multiplexed audio stream. The time stamp correction performed at 338 and the packaging of synchronized streams at 340 may be similarly applied to two or more multiplexed audio streams and at least one composited video stream to obtain streaming packets that may be streamed to a remote device over a network.

Figure 4:
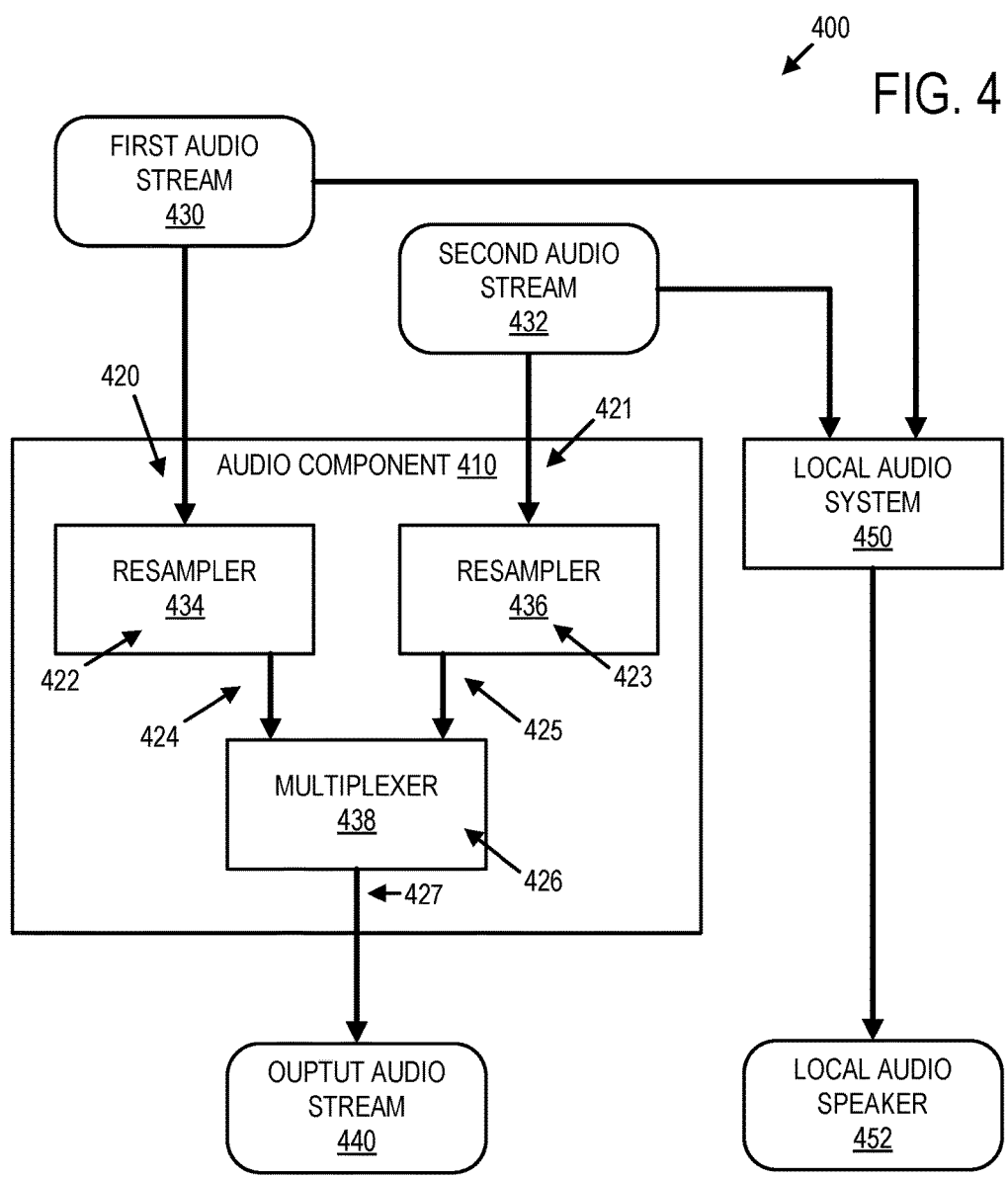
FIG. 4 is a schematic diagram depicting an audio component of an example streaming pipeline.

FIG. 4 is a schematic diagram depicting an audio component 410 of an example streaming pipeline 400. Streaming pipeline 400 may be defined by a game streaming program, such as example game streaming program 230 of FIG. 2, for example. A computing platform, upon executing the game streaming program, may initiate a plurality of process threads of a plurality of active processes.

A first input thread 420 of an input process of the streaming pipeline may be used to actively monitor incoming audio samples of a first audio stream 430. First audio stream 430 may correspond to a microphone audio stream, for example. Thread 420 may be used, for example, to actively monitor the first audio stream to identify an input sample rate and/or an input audio level of the first audio stream. As a non-limiting example, the first audio stream may have an input sample rate of 44.1 kHz.

A second input thread 421 of the input process may be used to actively monitor incoming audio samples of a second audio stream 432. Second audio stream 432 may correspond to a game audio stream or other application audio stream, for example. Thread 421 may be used, for example, to actively monitor the second audio stream to identify an input sample rate and/or an input audio level of the second audio stream. As a non-limiting example, the second audio stream may have an input sample rate of 120 kHz, which differs from the input sample rate of the first audio stream. An additional input thread of the input process may be used for each additional input audio stream. For example, a third input thread of the input process may be used to actively monitor a third input audio stream as previously described with reference to threads 420 and 421.

A resampler process of the streaming pipeline performs software-based resampling of the incoming audio samples of the first audio stream and/or the second audio stream from an input sample rate to a common sample rate. As a non-limiting example, the common sample rate may have a sample rate of 48 kHz. The resampler process may support any suitable quantity of resampler process instances, which correspond to respective audio streams to be resampled. Accordingly, resampler process instances 434 and 436 may refer to individual instances of the same resampler process.

Each resampler process instance may perform resampling using a respective thread. For example, resampler process instances 434 and 436 may each perform resampling of respective input audio streams using threads 422 and 423, respectively. Furthermore, each resampler process instance may use a respective resampler callback thread to output a resampled audio stream in the case where an input audio stream is resampled. For example, resampler process instances 434 and 436 may each output resampled audio streams using resampler callback threads 424 and 425, respectively. An additional resampler process instance including an additional resampler thread and an additional resampler callback thread may be used for each additional input audio stream that is to be resampled. For example, a third resampler process instance may use a third resampler thread and third resampler callback thread to resample a third audio input stream and output a third resampled audio stream.

A multiplexer process instance 438 of a multiplexer process may perform software-based multiplexing of the first and second audio streams of the streaming pipeline using a multiplexer thread 426. Multiplexer process instance 438 of the multiplexer process may further perform audio balancing of the first and second audio streams using multiplexer thread 426, such as previously described with reference to operation 318 of FIG. 3.

In examples where resampling is performed for an audio stream by a resampler process instance, the multiplexer process receives as input the resampled audio stream that was output using a resampler callback thread. In examples where resampling is not performed for an audio stream (e.g., if the input audio stream had a sampling rate that was the same as the common sampling rate), the multiplexer process receives as input the input audio stream that was received by the input process, and resampling may be omitted for that audio stream.

Multiplexer process instance 438 outputs the multiplexed audio stream as output audio stream 440 using a multiplexer callback thread 427. The multiplexed audio stream may be encoded and combined with one or more video streams for streaming to a remote device as previously described with reference to operations 328-346 of FIG. 3.

FIG. 4 further depicts how instances of the first and second audio streams 430 and 432 may also be provided to a local audio system 450 of the source client system without audio component 410 of the streaming pipeline being applied. The local audio system may, for example, output the first and second audio streams via a local audio speaker 452. The local audio system may support a local audio mixer that enables the user to locally rebalance the first and second audio streams output by local audio speaker 452. For example, a microphone audio stream may not be output by local audio speaker 452 and/or echo cancelation may be applied to the microphone audio stream to reduce echo and/or feedback at the source client system. By providing independent audio paths for the local audio system and the streaming pipeline, rebalanced audio streams within the streaming pipeline will not adversely impact features of the local audio system, such as speech and/or voice recognition, echo cancellation, etc.

In at least some implementations, the computing platform executing the game streaming program or other suitable program type may prioritize operations associated with certain process threads in relation to other process threads. The program may define a default priority among the process threads of its various processes to be scheduled by a scheduler of an operating system on which the program is executed. The default priority may be implemented as a priority table that defines a relationship between threads and their respective priority in relation to each other thread.

As an example, the default priority may prioritize threads used later in the streaming pipeline over threads used earlier in the streaming pipeline. Within the context of streaming pipeline 400, for example, multiplexer callback thread 427 may be prioritized over multiplexer thread 426, which in turn may be prioritized over resampler callback threads 424 and 425, which in turn may be prioritized over resampler threads 422 and 423, which in turn may be prioritized over input threads 420 and 421. This approach allows for multiplexed samples to be output with a higher priority than incoming samples, given the processing resource constraints of the computing platform.

In at least some implementations, priority among threads may be changed by the program from the default priority to an updated priority responsive to detecting a particular condition. The changing of priority among threads may be performed by a priority manager process of the program, which may update thread priority at the scheduler of the operating system in response to the condition being detected.

As an example, a function in multiplexer process instance 438 may initiate a timer upon receiving a frame or packet of a first audio stream. If a corresponding frame or packet of a second audio stream (or all other audio streams in the case of multiplexing three or more audio streams) to be multiplexed with the first audio stream has not been received within a threshold period of time, then the multiplexer thread may be released and a different thread having a lesser priority may be used to perform a different operation of the streaming pipeline. This approach enables the multiplexing process to be suspended in favor of another thread in response to the condition where a frame or packet on an input side of the multiplexer has been dropped or otherwise delayed. The frame or packet of the first audio stream may be passed to the multiplexer callback thread to be encoded and synchronized with the video stream in the absence of the frame or packet of the second audio stream. Within the context of real-time streaming implementations, the threshold time described above may be defined to be sufficiently short that a typical human observer would be unable or unlikely to notice a missing portion of the multiplexed audio.

In at least some implementations, the methods and processes described herein may be tied to a computing system of one or more computing devices. In particular, such methods and processes may be implemented as a computer-application program or service, an application-programming interface (API), a library, and/or other computer-program product.

Figure 5:
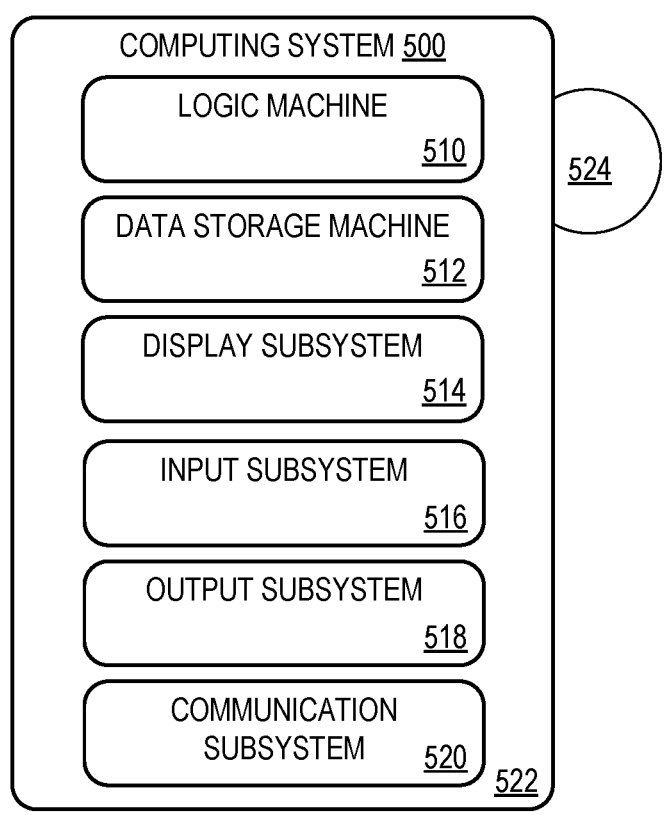
FIG. 5 is a schematic diagram depicting additional aspects of an example computing system.

FIG. 5 schematically shows a non-limiting example of a computing system 500 that can enact one or more of the methods and processes described above. For example, computing system 500 may be representative of computing system 200 of FIG. 2, or the various computing devices and/or computing platforms thereof, including source client system 210, remote client system 270, server system 262, etc. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 510 and a data storage machine 512. Computing system 500 may optionally include a display subsystem 514 (e.g., an integrated or peripheral graphical display device), an input subsystem 516, an output subsystem 518, a communication subsystem 520, and/or other components not shown in FIG. 5.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 512 includes one or more physical devices configured to hold instructions executable by the logic machine to implement the methods and processes described herein. When such methods and processes are implemented, the state of storage machine 512 may be transformed—e.g., to hold different data.

Storage machine 512 may include removable and/or built-in devices. Storage machine 512 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 512 may include volatile, nonvolatile, dynamic, static, read/write, read-only, random-access, sequential-access, location-addressable, file-addressable, and/or content-addressable devices.

It will be appreciated that storage machine 512 includes one or more physical devices. However, aspects of the instructions described herein alternatively may be propagated by a communication medium (e.g., an electromagnetic signal, an optical signal, etc.) that is not held by a physical device for a finite duration. Furthermore, aspects of instructions described herein may reside on removable media devices, such as represented schematically at 524.

Logic machine 510 and storage machine 512 may be collectively referred to as a computing platform. Aspects of logic machine 510 and storage machine 512 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 510 executing instructions held by storage machine 512. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices. As an example, a service hosted at server system 262 of FIG. 2 may facilitate streaming from source client system 210 to a population of many receiving client systems which receiving client system 270 is an example.

When included, display subsystem 514 may be used to present a visual representation of data held by storage machine 512. This visual representation may take the form of a graphical user interface (GUI). As the herein described methods and processes change the data held by the storage machine, and thus transform the state of the storage machine, the state of display subsystem 514 may likewise be transformed to visually represent changes in the underlying data. Display subsystem 514 may include one or more graphical display devices utilizing virtually any type of technology. Such display devices may be combined with logic machine 510 and/or storage machine 512 in a shared enclosure 522 (e.g., as depicted with reference to mobile computing device 110 of FIG. 1), or such display devices may be peripheral display devices.

When included, input subsystem 516 may comprise or interface with one or more user-input devices such as a keyboard, mouse, touch screen, game controller, microphone, inertial sensor, etc. For example, a microphone of input subsystem 516 may be integrated with a computing platform containing logic machine 510 and data storage machine 512 via a common enclosure 522, or the microphone may be a peripheral device that is separate from and interfaces with the computing platform via one or more wired or wireless communication links. A wireless microphone may provide a microphone audio stream to a computing device over a wireless communications link using a wireless protocol, such as Bluetooth, as a non-limiting example.

In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, output subsystem 518 may comprise or interface with one or more output devices such as an audio speaker, a haptic feedback device (e.g., a vibration motor), etc. For example, an audio speaker of output subsystem 518 may be integrated with a computing platform containing logic machine 510 and data storage machine 512 via a common enclosure 522, or the audio speaker may be a peripheral device that is separate from and interfaces with the computing platform via one or more wired or wireless communication links.

When included, communication subsystem 520 may be configured to communicatively couple computing system 500 with one or more other computing devices. Communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, a mobile computing device for streaming multiple sources of audio and video includes: a camera to generate a camera video stream; a microphone to generate a microphone audio stream; and a computing platform programmed to: receive the camera video stream generated by the camera; receive the microphone audio stream generated by the microphone at a microphone input level; receive a game audio stream generated by a game program executed at the mobile computing device at a game input level; receive a game video stream generated by the game program executed at the mobile computing device; adjust one or both of the microphone input level and the game input level based on a user-selected audio mix setting to produce rebalanced microphone and game audio streams; multiplex the rebalanced microphone and game audio streams to produce a multiplexed audio stream; encode, via an audio encoder, the multiplexed audio stream to produce an encoded audio stream; composite the camera video stream and the game video stream to produce a composited video stream; encode, via a video encoder, the composited video stream to produce an encoded video stream; package the encoded audio and video streams into one or more streaming packets; and output the one or more streaming packets. In this example or any other example, the computing platform is further programmed to: receive a user input; and adjust a value of the audio mix setting within a range of values responsive to the user input. In this example or any other example, a first end of the range of values corresponds to a greater contribution of the microphone audio stream relative to the game audio stream within the rebalanced microphone and game audio streams; and a second end of the range of values corresponds to a greater contribution of the game audio stream relative to the microphone audio stream within the rebalanced microphone and game audio streams. In this example or any other example, the computing platform is further programmed to: present, via a graphical display device, a graphical user interface that includes an audio mix control element; and the user input is directed at the audio mix control element. In this example or any other example, the audio mix control element includes one or more graphical buttons that, upon selection by the user input, varies the value of the user-selected audio mix setting within the range of values. In this example or any other example, a spatial position of the audio mix control element within a range of positions corresponds to the value of the user-selected audio mix setting within the range of values. In this example or any other example, the audio mix control element includes a graphical slider that is translatable within the range of positions or a graphical knob that is rotatable within the range of positions. In this example or any other example, the value of the user-selected audio mix setting is initially set to a default value, prior to the user input being received, that corresponds to a pre-defined adjustment of the microphone input level and/or the game input level. In this example or any other example, the computing platform is further programmed to: initiate a socket connection to a remote computing device; and send the one or more streaming packets to the remote computing device via the socket connection in real-time. In this example or any other example, the computing platform is further programmed to: resample one or more of the microphone audio stream and/or the game audio stream to a common sample rate prior to multiplexing the microphone audio stream and the game audio stream. In this example or any other example, the computing platform is further programmed to: initiate a plurality of process threads in which: a first input thread actively monitors incoming audio samples of the microphone audio stream; a second input thread actively monitors incoming audio samples of the game audio stream; a first resampler thread performs software-based resampling of the microphone audio stream from a first input sample rate to the common sample rate as a resampled microphone audio stream; a second resampler thread performs software-based resampling of the game audio stream from a second input sample rate to the common sample rate as a resampled game audio stream; a first resampler callback thread that outputs the resampled microphone audio stream; a second resampler callback thread that outputs the resampled game audio stream; a multiplexer thread that performs software-based multiplexing of the resampled microphone audio stream and the resampled game audio stream to obtain the multiplexed audio stream; and a multiplexer callback thread that outputs the multiplexed audio stream. In this example or any other example, the computing platform is further programmed to: during a first condition, prioritize the process threads according to a default priority in which the multiplexer callback thread is prioritized over the multiplexer thread, which is prioritized over the first and second resampler callback threads, which are prioritized over the first and second resampler threads, which are prioritized over the first and second input threads. In this example or any other example, the computing platform is further programmed to: during a second condition in which a frame or a packet is not available for multiplexing for more than a threshold period of time, prioritize the process threads according to an updated priority in which one or more of the first resampler callback thread, second resampler callback thread, first resampler thread, second resampler thread, first input thread, and/or second input thread are prioritized over the multiplexer thread. In this example or any other example, the computing platform is further programmed to: the microphone audio stream and the game audio stream are received in parallel; and the rebalanced microphone and game audio streams are multiplexed in real-time to produce the multiplexed audio stream. In this example or any other example, the computing platform is further programmed to: the camera video stream and the game video stream are received in parallel, and are composited in real-time to produce the composited video stream; and the multiplexed audio stream and the composited video stream are encoded in parallel.

In another example, a method for broadcasting game audio and video with user audio and video using a computing device includes: receiving a microphone audio stream generated by a microphone at a microphone input level; receiving a game audio stream generated by a game program executed at the computing device at a game input level; presenting a graphical user interface via a display device, the graphical user interface including an audio mix control element; receiving a user input directed at the audio mix control element; identifying an audio mix setting responsive to the user input; adjusting one or more of the microphone input level and/or the game input level based on the user-selected audio mix setting to produce rebalanced microphone and game audio streams; multiplexing the rebalanced microphone and game audio streams to produce a multiplexed audio stream; encoding, via an audio encoder, the multiplexed audio stream to produce an encoded audio stream; receiving a camera video stream generated by a camera or a game video stream generated by the game program executed at the computing device as a component of an input video stream; encoding, via a video encoder, the input video stream to produce an encoded video stream; packaging encoded audio and video streams into one or more streaming packets; and outputting the one or more streaming packets. In this example or any other example, the input video stream is a composited video stream that includes both the camera video stream generated by the camera and the game video stream generated by the game program executed at the computing device. In this example or any other example, the method further includes: receiving both the camera video stream and the game video stream; and compositing the camera video stream and the game video stream to produce the composited video stream. In this example or any other example, the game program is a game program. In this example or any other example, the method further includes initiating a socket connection to a remote computing device; and sending the one or more streaming packets to the remote computing device via the socket connection. In this example or any other example, the method further includes: resampling one or more of the microphone audio stream and/or the game audio stream to a common sample rate prior to multiplexing the microphone audio stream and the game audio stream.

In another example, a computing system for streaming of multiple sources of audio and video includes: one or more logic machines configured to: execute a game program; receive a game audio stream generated by execution of the game program at a game input level; receive a microphone audio stream generated by a microphone at a microphone input level contemporaneously and in parallel with the game audio stream; resample one or both of the microphone audio stream and the game audio stream to a common sample rate using software-based conversion of incoming audio samples of an input sample rate to the common sample rate; adjust one or both of the microphone input level and the game input level based on a user-selected audio mix setting to produce rebalanced microphone and game audio streams; multiplex the rebalanced microphone and game audio streams to produce a multiplexed audio stream using software-based multiplexing that is prioritized over resampling of the microphone and/or game audio streams; encode, via an audio encoder, the multiplexed audio stream to produce an encoded audio stream; receive a camera video stream generated by a camera; receive a game video stream generated by the game program contemporaneously and in parallel with the game audio stream and the camera video stream; composite the camera video stream and the game video stream to produce a composited video stream; encode, via a hardware-specific video encoder, the composited video stream to produce an encoded video stream; package the encoded audio and video streams into one or more streaming packets; initiate a socket connection to a remote computing device; and send the one or more streaming packets to the remote computing device via the socket connection.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A mobile computing device for streaming multiple sources of audio and video, the mobile computing device comprising:
 a camera to generate a camera video stream;
 a microphone to generate a microphone audio stream;
 a computing platform programmed to:
  receive the camera video stream generated by the camera;
  receive the microphone audio stream generated by the microphone at a microphone input level;
  receive a game audio stream generated by a game program executed at the mobile computing device at a game input level;
  receive a game video stream generated by the game program executed at the mobile computing device;
  resample one or more of the microphone audio stream and/or the game audio stream to a common sample rate for both the microphone audio stream and the game audio stream;
  adjust one or both of the microphone input level and the game input level, following resampling to the common sample rate, based on a user-selected audio mix setting to produce rebalanced microphone and game audio streams;
  multiplex the rebalanced microphone and game audio streams to produce a multiplexed audio stream following one or more of the microphone audio stream and/or the game audio stream being resampled to the common sample rate;
  encode, via an audio encoder, the multiplexed audio stream to produce an encoded audio stream;
  composite the camera video stream and the game video stream to produce a composited video stream;
  encode, via a video encoder, the composited video stream to produce an encoded video stream;
  package the encoded audio and video streams into one or more streaming packets; and
  output the one or more streaming packets.

2. The mobile computing device of claim 1, wherein the computing platform is further programmed to:
 receive a user input; and
 adjust a value of the audio mix setting within a range of values responsive to the user input.

3. The mobile computing device of claim 2, wherein a first end of the range of values corresponds to a greater contribution of the microphone audio stream relative to the game audio stream within the rebalanced microphone and game audio streams; and
 wherein a second end of the range of values corresponds to a greater contribution of the game audio stream relative to the microphone audio stream within the rebalanced microphone and game audio streams.

4. The mobile computing device of claim 2, wherein the computing platform is further programmed to:
 present, via a graphical display device, a graphical user interface that includes an audio mix control element;
 wherein the user input is directed at the audio mix control element.

5. The mobile computing device of claim 4, wherein the audio mix control element includes one or more graphical buttons that, upon selection by the user input, varies the value of the user-selected audio mix setting within the range of values.

6. The mobile computing device of claim 4, wherein a spatial position of the audio mix control element within a range of positions corresponds to the value of the user-selected audio mix setting within the range of values.

7. The mobile computing device of claim 6, wherein the audio mix control element includes a graphical slider that is translatable within the range of positions or a graphical knob that is rotatable within the range of positions.

8. The mobile computing device of claim 2, wherein the value of the user-selected audio mix setting is initially set to a default value, prior to the user input being received, that corresponds to a pre-defined adjustment of the microphone input level and/or the game input level.

9. The mobile computing device of claim 1, wherein the computing platform is further programmed to:
 initiate a socket connection to a remote computing device; and
 send the one or more streaming packets to the remote computing device via the socket connection in real-time.

10. The mobile computing device of claim 1, wherein the computing platform is further programmed to:
 initiate a plurality of process threads in which:
  a first input thread actively monitors incoming audio samples of the microphone audio stream;
  a second input thread actively monitors incoming audio samples of the game audio stream;
  a first resampler thread performs software-based resampling of the microphone audio stream from a first input sample rate to the common sample rate as a resampled microphone audio stream;
  a second resampler thread performs software-based resampling of the game audio stream from a second input sample rate to the common sample rate as a resampled game audio stream;
  a first resampler callback thread that outputs the resampled microphone audio stream;
  a second resampler callback thread that outputs the resampled game audio stream;
  a multiplexer thread that performs software-based multiplexing of the resampled microphone audio stream and the resampled game audio stream to obtain the multiplexed audio stream; and
  a multiplexer callback thread that outputs the multiplexed audio stream.

11. The mobile computing device of claim 10, wherein the computing platform is further programmed to:
 during a first condition, prioritize the process threads according to a default priority in which the multiplexer callback thread is prioritized over the multiplexer thread, which is prioritized over the first and second resampler callback threads, which are prioritized over the first and second resampler threads, which are prioritized over the first and second input threads; and
 during a second condition in which a frame or a packet is not available for multiplexing for more than a threshold period of time, prioritize the process threads according to an updated priority in which one or more of the first resampler callback thread, second resampler callback thread, first resampler thread, second resampler thread, first input thread, and/or second input thread are prioritized over the multiplexer thread.

12. The mobile computing device of claim 1, wherein the microphone audio stream and the game audio stream are received in parallel; and
  wherein the rebalanced microphone and game audio streams are multiplexed in real-time to produce the multiplexed audio stream.

13. The mobile computing device of claim 1, wherein the camera video stream and the game video stream are received in parallel, and are composited in real-time to produce the composited video stream; and
  wherein the multiplexed audio stream and the composited video stream are encoded in parallel.

14. A method for broadcasting game audio and video with user audio and video using a computing device, the method comprising:
  receiving a microphone audio stream generated by a microphone at a microphone input level;
  receiving a game audio stream generated by a game program executed at the computing device at a game input level;
  presenting a graphical user interface via a display device, the graphical user interface including an audio mix control element;
  receiving a user input directed at the audio mix control element;
  identifying an audio mix setting responsive to the user input;
  resampling one or more of the microphone audio stream and/or the game audio stream to a common sample rate for both the microphone audio stream and the game audio stream;
  adjusting one or more of the microphone input level and/or the game input level, following resampling to the common sample rate, based on the user-selected audio mix setting to produce rebalanced microphone and game audio streams;
  multiplexing the rebalanced microphone and game audio streams to produce a multiplexed audio stream following one or more of the microphone audio stream and/or the game audio stream being resampled to the common sample rate;
  encoding, via an audio encoder, the multiplexed audio stream to produce an encoded audio stream;
  receiving a camera video stream generated by a camera or a game video stream generated by the game program executed at the computing device as a component of an input video stream;
  encoding, via a video encoder, the input video stream to produce an encoded video stream;
  packaging encoded audio and video streams into one or more streaming packets; and
  outputting the one or more streaming packets.

15. The method of claim 14, wherein the input video stream is a composited video stream that includes both the camera video stream generated by the camera and the game video stream generated by the game program executed at the computing device; and
  wherein the method further comprises:
    receiving both the camera video stream and the game video stream; and
    compositing the camera video stream and the game video stream to produce the composited video stream.

16. The method of claim 14, wherein the game program is a mobile game program and the computing device is a mobile computing device.

17. The method of claim 14, further comprising:
  initiating a socket connection to a remote computing device; and
  sending the one or more streaming packets to the remote computing device via the socket connection.

18. A computing system for streaming of multiple sources of audio and video, the computing system comprising:
  one or more logic machines configured to:
    execute a game program;
    receive a game audio stream generated by execution of the game program at a game input level;
    receive a microphone audio stream generated by a microphone at a microphone input level contemporaneously and in parallel with the game audio stream;
    resample one or both of the microphone audio stream and the game audio stream to a common sample rate for both the microphone audio stream and the game audio stream using software-based conversion of incoming audio samples of an input sample rate to the common sample rate;
    adjust one or both of the microphone input level and the game input level, following resampling to the common sample rate, based on a user-selected audio mix setting to produce rebalanced microphone and game audio streams;
    multiplex the rebalanced microphone and game audio streams to produce a multiplexed audio stream following one or both of the microphone audio stream and/or the game audio stream being resampled to the common sample rate using software-based multiplexing that is prioritized over resampling of the microphone and/or game audio streams;
    encode, via an audio encoder, the multiplexed audio stream to produce an encoded audio stream;
    receive a camera video stream generated by a camera;
    receive a game video stream generated by the game program contemporaneously and in parallel with the game audio stream and the camera video stream;
    composite the camera video stream and the game video stream to produce a composited video stream;
    encode, via a hardware-specific video encoder, the composited video stream to produce an encoded video stream;
    package the encoded audio and video streams into one or more streaming packets;
    initiate a socket connection to a remote computing device; and
    send the one or more streaming packets to the remote computing device via the socket connection.

* * * * *